June 20, 1933.  T. WALTON  1,914,874
PHOTOGRAPHIC CAMERA
Filed Sept. 23, 1930

INVENTOR:
Tom Walton
by Monroe E. Miller
Atty.

Patented June 20, 1933

1,914,874

UNITED STATES PATENT OFFICE

TOM WALTON, OF ACCRINGTON, ENGLAND

PHOTOGRAPHIC CAMERA

Application filed September 23, 1930, Serial No. 483,903, and in Great Britain September 1, 1930.

This invention relates to a photographic camera and has for its object to introduce an improved and simplified mounting for the lens which will dispense with the rising fronts and cross slides as now used for getting vertical and lateral adjustment of the lens in these directions and enable a very much larger and more complete range of adjustment to be obtained thereby rendering the camera particularly suitable for wide angle work and commercial work, such for example, as photographing architectural work, shop windows, or interiors, also for photographing engineering work, machines, and the like, and aerial or ground survey work.

According to this invention the lens is mounted close to the edge of a disc that is eccentrically and rotatably mounted in an outer disc that is rotatably mounted in the camera front, the arrangement being such that by turning the inner disc in relation to the outer disc, the lens can be moved to a central position in relation to the outer disc, or to a more or less eccentric position in relation to the latter, the various turning movements of the two discs enabling the lens to be moved into any position over the area of the combined discs, from a central position to a more or less eccentric position in any direction. If desired a battery of lenses of different focal lengths may be mounted on the inner disc, caps or stops being provided for covering up the lenses that are not in use.

In the accompanying drawings:—

Figure 1:
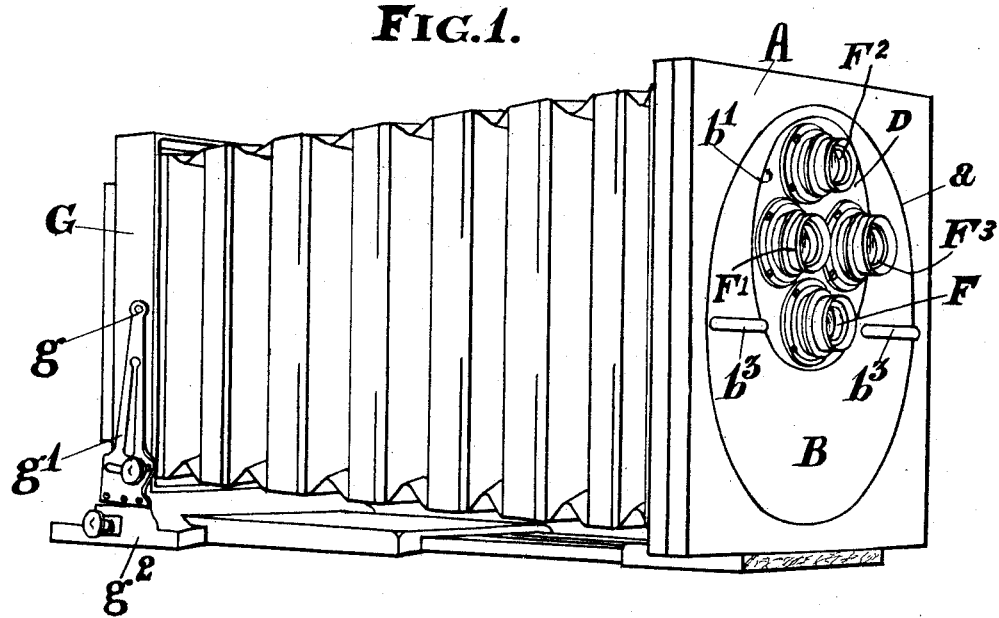
Fig. 1 is a perspective view of a camera provided with means for enabling the position of the lens to be adjusted in accordance with this invention.
Figure 2:
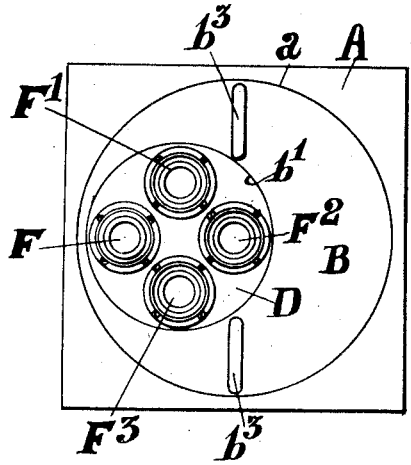
Figs. 2 and 3 are views of the camera front showing two positions of the lens.
Figure 4:
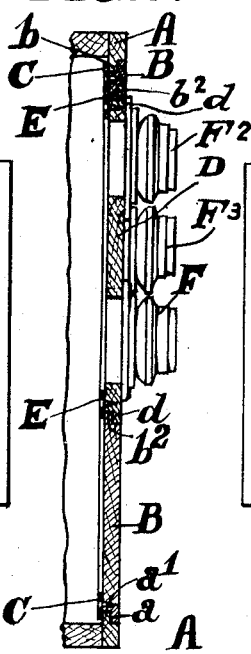
Fig. 4 is a section taken through the front of the camera showing one method of construction.
Figure 3:
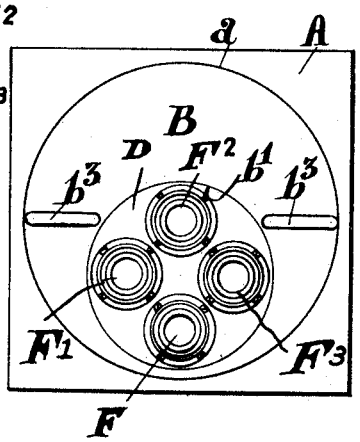

In carrying out the invention the camera front A is made square and as large as it can conveniently be made in proportion to the size of the camera. In this front a circular opening $c$ is made which extends into proximity to the edges of the front. Rotatably mounted in this front is the outer disc B which may have its edges rebated at $b$ Fig. 4, to fit the opening A which is also rebated as shown at $a^1$ Fig. 4 to fit the rebated portion of the disc B which is kept in position by an internally flanged ring or plate C screwed to the disc B, velvet or other packing material being interposed in the joint if necessary for making it light tight. The disc B has a circular aperture $b^1$ formed in it eccentrically. The inner disc D fits this aperture and may also be formed with a rebated edge $d$ to fit a corresponding rebated edge $b^2$ in the disc B and be secured by a ring E secured to the inner disc. Eccentrically mounted on the inner disc D is the lens F which is of the wide angle variety. The outer disc may be provided with cross bars $b^3$ for turning purposes and the turning movement of the inner disc may be effected by means of the lens F. In Fig. 2 $F^1$, $F^2$, $F^3$ indicate a battery of lenses for alternative use which may be of different focal lengths or of different varieties to suit different purposes, the lenses that are not in use being provided with caps or other closures. The back of the camera G may be mounted on pivots $g$ on brackets $g^1$ carried by the base $g^2$ so that the focussing screen can be swung to a vertical position and clamped in the event of its being necessary to tilt the camera, and such back may telescope within the front when the camera is folded up.

By the invention described various perspective views of one object can be obtained from the same view point without moving the camera or the object, but simply by moving the lens until the required perspective is obtained when looking through the focussing screen. Large objects can be taken at closer range than they can be done at present with the ordinary lens adjustment facilities. Separate photographs of upper and lower portions of a building for example, can be taken at one setting, and will fit perfectly when joined up. In like manner separate photographs can be taken at one setting of the right and left hand end of a building or other object which will also fit perfectly when joined up, and when taking a perspective view of an article that may be of a considerable length the camera can be so set as to produce a perspective view in which the portion that is most remote from the camera will not diminish greatly in size from the part that is nearest to the camera.

What I claim as my invention and desire to secure by Letters Patent in the United States is:—

1. A photographic camera comprising a rotatably mounted disc arranged in the camera front, and second disc eccentrically and rotatably mounted in said first mentioned disc, said disc carrying two or more lenses for alternative use.

2. A photographic camera comprising a rotatably mounted disc arranged in the camera front and having an opening therein, a second disc rotatably mounted in said opening, and two or more lenses carried by the second disc.

In testimony whereof I hereunto affix my signature.

TOM WALTON.